(12) United States Patent
Yu (10) Patent No.: US 10,170,074 B2
(45) Date of Patent: Jan. 1, 2019

(54) DISPLAY SCREEN ADJUSTING METHOD, DISPLAY SCREEN ADJUSTING APPARATUS, AS WELL AS DISPLAY DEVICE

(71) Applicant: BOE TECHNOLOGY GROUP CO., LTD., Beijing (CN)

(72) Inventor: Jing Yu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 178 days.

(21) Appl. No.: 15/207,831

(22) Filed: Jul. 12, 2016

(65) Prior Publication Data
US 2017/0278476 A1 Sep. 28, 2017

(30) Foreign Application Priority Data

Mar. 23, 2016 (CN) .......................... 2016 1 0170393

(51) Int. Cl.
*G09G 5/00* (2006.01)
*G09G 5/38* (2006.01)
*G06F 3/01* (2006.01)

(52) U.S. Cl.
CPC ............. *G09G 5/003* (2013.01); *G06F 3/013* (2013.01); *G09G 5/38* (2013.01); *G09G 2320/028* (2013.01); *G09G 2320/068* (2013.01)

(58) Field of Classification Search
CPC .............. G06F 3/013; G09G 2320/028; G09G 2320/068; G09G 5/003; G09G 5/38
See application file for complete search history.

(56) References Cited

U.S. PATENT DOCUMENTS 7,626,569 B2 * 12/2009 Lanier ................... G06F 1/1601
345/156
9,298,254 B2 * 3/2016 Ha ............................ G06F 3/01
(Continued)

FOREIGN PATENT DOCUMENTS

CN 102419632 A 4/2012
CN 103685907 A 3/2014
(Continued)

OTHER PUBLICATIONS

Office Action received for Chinese Patent Application No. 201610170393.X, dated Mar. 23, 2018, 11 pages (5 pages of English Translation and 6 pages of Office Action).

*Primary Examiner* — Dmitriy Bolotin
(74) *Attorney, Agent, or Firm* — Womble Bond Dickinson (US) LLP (57) ABSTRACT

The present disclosure provides a display screen adjusting method, a display screen adjusting apparatus and a display device. The method comprises the steps of: acquiring visual angle information and fixation point position information of a user relative to a display screen; determining a reference point position to which the display screen needs to be adjusted according to the fixation point position information; and adjusting the angle and position of the display screen according to the visual angle information, the reference point position and the current position of the display screen in light of a predetermined rule. The display screen adjusting method, the display screen adjusting apparatus and the display device can automatically adjust the angle and position of the display screen simultaneously without manual operation, thereby improving the user's viewing experience.

14 Claims, 2 Drawing Sheets

(56) References Cited

U.S. PATENT DOCUMENTS

| | | | | |
|---|---|---|---|---|
| 2004/0179714 | A1* | 9/2004 | Jouppi | H04N 7/144 382/103 |
| 2004/0183750 | A1* | 9/2004 | Nagano | G02B 27/0101 345/7 |
| 2007/0230797 | A1* | 10/2007 | Hisanaga | G06K 9/00248 382/195 |
| 2009/0239579 | A1* | 9/2009 | Lee | G06F 1/1626 455/556.1 |
| 2010/0185990 | A1* | 7/2010 | Ha | G06F 3/01 715/863 |
| 2012/0050138 | A1* | 3/2012 | Sato | B60K 35/00 345/4 |
| 2012/0066705 | A1* | 3/2012 | Harada | H04N 21/42201 725/12 |
| 2014/0293020 | A1* | 10/2014 | Uehara | H04N 13/0477 348/51 |
| 2015/0177906 | A1* | 6/2015 | Yairi | G06T 3/0006 345/648 |
| 2016/0057412 | A1* | 2/2016 | Lee | H04N 13/0022 348/51 |
| 2016/0209663 | A1* | 7/2016 | Hirokawa | G02B 27/0101 |
| 2017/0115732 | A1* | 4/2017 | Lian | G06F 3/013 |
| 2017/0336632 | A1* | 11/2017 | Ushida | G02B 27/0149 |

FOREIGN PATENT DOCUMENTS

| | | |
|---|---|---|
| CN | 102743150 | 9/2014 |
| CN | 104122985 A | 10/2014 |
| CN | 104503092 A | 4/2015 |
| CN | 104679225 | 6/2015 |

* cited by examiner

DISPLAY SCREEN ADJUSTING METHOD, DISPLAY SCREEN ADJUSTING APPARATUS, AS WELL AS DISPLAY DEVICE

RELATED APPLICATIONS

The present application claims the benefit of Chinese Patent Application No. 201610170393.X, filed on Mar. 23, 2016, the entire disclosure of which is incorporated herein by reference.

TECHNICAL FIELD

The present disclosure relates to the field of display technology, and more particularly to a display screen adjusting method, a display screen adjusting apparatus, as well as a display device.

BACKGROUND ART

With the rapid development of display technology, people are getting more inclined to browse or check information through display terminals, which therefore have become an indispensable part of our lives. Giving users a better viewing experience is always an unremitting pursuit in the field of display technology.

In addition to image quality of display terminals, proper viewing angles and positions can greatly optimize users' viewing experience. However, the current method for adjusting the screen of a display terminal is still limited to manual adjustments such that a user while watching has to manually adjust a screen according to the influence of lights and position, which not only wastes time, but also affects the user's viewing experience if the screen is not properly adjusted. Moreover, the disabled whose hands cannot move easily are unable to adjust a screen in the above-mentioned manner, thereby suffering from a bad viewing experience.

SUMMARY

In the present field, it is desired to provide a display screen adjusting method, a display screen adjusting apparatus and a display device for solving the prior art problem of poor display screen adjusting effect which affects the user's viewing experience.

According to one aspect, there is provided a display screen adjusting method, comprising the steps of:

acquiring visual angle information and fixation point position information of a user relative to a display screen, the visual angle information comprising an angle formed between the sight line of the user and a plane of the display screen, and the fixation point position information comprising the position where the sight line of the user intersects with the plane of the display screen;

determining a reference point position to which the display screen needs to be adjusted according to the fixation point position information; and adjusting the angle and position of the display screen according to the visual angle information, the reference point position and the current position of the display screen in light of a predetermined rule.

In an embodiment, the step of acquiring the visual angle information and fixation point position information of the user relative to the display screen comprises acquiring the visual angle information and fixation point position information of the user relative to the display screen when the time period during which the sight line of the user is kept fixed exceeds a predetermined time period.

In an embodiment, the step of adjusting the angle and position of the display screen according to the visual angle information, the reference point position and the current position of the display screen in light of the predetermined rule comprises adjusting the angle of the display screen according to the visual angle information so as to make the plane of the adjusted display screen perpendicular to the sight line of the user; and/or adjusting the central position of the display screen to coincide with the reference point position according to the reference point position and the current position of the display screen.

In an embodiment, the visual angle information and the fixation point position information are visual angle information and fixation point position information of the user's both eyes relative to the display screen, and the step of determining the reference point position to which the display screen needs to be adjusted according to the fixation point position information comprises: when the fixation point position information is two positions where the sight lines of the user's two eyes respectively intersect with the plane of the display screen, taking the central point of the line connecting the two positions as the reference point position; when the fixation point position information is one position where the sight lines of the user's two eyes intersect with the plane of the display screen, taking the one position as the reference point position.

In an embodiment, the step of adjusting the angle and position of the display screen according to the visual angle information, the reference point position and the current position of the display screen in light of the predetermined rule comprises adjusting the angle of the display screen according to the visual angle information so as to make the plane of the adjusted display screen perpendicular to an bisector of an angle formed between the sight lines of the user's two eyes; and/or adjusting the central position of the display screen to coincide with the reference point position according to the reference point position and the current position of the display screen.

In an embodiment, the step of adjusting the angle and position of the display screen according to the visual angle information, the reference point position and the current position of the display screen in light of the predetermined rule also comprises: when the fixation point position information is two positions where the sight lines of the user's two eyes respectively intersect with the plane of the display screen, adjusting an edge of the display screen to be parallel to the line connecting the two positions where the sight lines of the user's two eyes respectively intersect with the plane of the display screen.

In an embodiment, the display screen adjusting method further comprises: initiating a screen adjusting mode before acquiring the visual angle information and the fixation point position information; and turning off the screen adjusting mode after adjusting the angle and position.

According to another aspect, there is provided a display screen adjusting apparatus. The display screen adjusting apparatus comprises an eyeball detection arrangement, a processor and a motion controller connected with a display screen. The eyeball detection arrangement is configured to acquire visual angle information and fixation point position information of a user relative to the display screen, the visual angle information comprising an angle formed between the sight line of the user and a plane of the display screen, and the fixation point position information comprising the position where the sight line of the user intersects with the plane of the display screen. The processor is configured to determine a reference point position to which the display screen needs to be adjusted according to the fixation point position information. The motion controller is configured to adjust the angle and position of the display screen according to the visual angle information, the reference point position and the current position of the display screen in light of a predetermined rule.

In an embodiment, the eyeball detection arrangement is also configured to acquire the visual angle information and fixation point position information of the user relative to the display screen when the time period during which the sight line of the user is kept fixed exceeds a predetermined time period.

In an embodiment, the motion controller is also configured to adjust the angle of the display screen according to the visual angle information so as to make the plane of the adjusted display screen perpendicular to the sight line of the user; and adjusting the central position of the display screen to coincide with the reference point position according to the reference point position and the current position of the display screen.

In an embodiment, the eyeball detection arrangement is configured to acquire visual angle information and fixation point position information of the user's both eyes relative to the display screen. The processor is also configured to, when the fixation point position information is two positions where the sight lines of the user's two eyes respectively intersect with the plane of the display screen, take the central point of the line connecting the two positions as the reference point position; when the fixation point position information is one position where the sight lines of the user's two eyes intersect with the plane of the display screen, take the one position as the reference point position.

In an embodiment, the motion controller is also configured to adjust the angle of the display screen according to the visual angle information so as to make the plane of the adjusted display screen perpendicular to an bisector of an angle formed between the sight lines of the user's two eyes; and adjust the central position of the display screen to coincide with the reference point position according to the reference point position and the current position of the display screen.

In an embodiment, the motion controller is also configured to, when the fixation point position information is two positions where the sight lines of the user's two eyes respectively intersect with the plane of the display screen, adjust an edge of the display screen to be parallel to the line connecting the two positions where the sight lines of the user's two eyes respectively intersect with the plane of the display screen.

In an embodiment, the display screen adjusting apparatus is also configured to initiate a screen adjusting mode before acquiring the visual angle information and the fixation point position information; and turn off the screen adjusting mode after adjusting the angle and position.

In an embodiment, the eyeball detection arrangement comprises an eye tracker.

According to another aspect, there is provided a display device comprising a display screen and any of the display adjusting apparatuses as described above.

The embodiments disclosed herein can achieve at least one of the following advantageous effects and/or other advantageous effects:

in the display screen adjusting method, the display screen adjusting apparatus and the display device according to some embodiments, the employed adjusting method comprises: acquiring visual angle information and fixation point position information of a user relative to a display screen; determining a reference point position to which the display screen needs to be adjusted according to the fixation point position information; and adjusting the angle and position of the display screen according to the visual angle information, the reference point position and the current position of the display screen in light of a predetermined rule. The above display screen adjusting method and apparatus provided by the above embodiments can automatically adjust the angle and position of the display screen with an optimal adjusting effect and with no need of manual regulation, which provides convenience to the user and improve the user's viewing experience.

BRIEF DESCRIPTION OF DRAWINGS

To explain the technical solutions in the embodiments more clearly, the drawings to be used in the Detailed Description will be briefly introduced below. It should be realized that the following drawings are only related to some embodiments. Those skilled in the art can obtain other drawings that fall within the scope of the present invention according to these drawings without making an inventive labour.

DETAILED DESCRIPTION

To assist those skilled in the art in better understanding the object, technical solutions and advantages of some embodiments, the embodiments will be further described in detail with reference to the drawings and Detailed Description.

To solve the problem of poor display screen adjusting effect that affects the user's viewing experience in the prior art, a display screen adjusting method and apparatus are provided by some embodiments.

Figure 1:
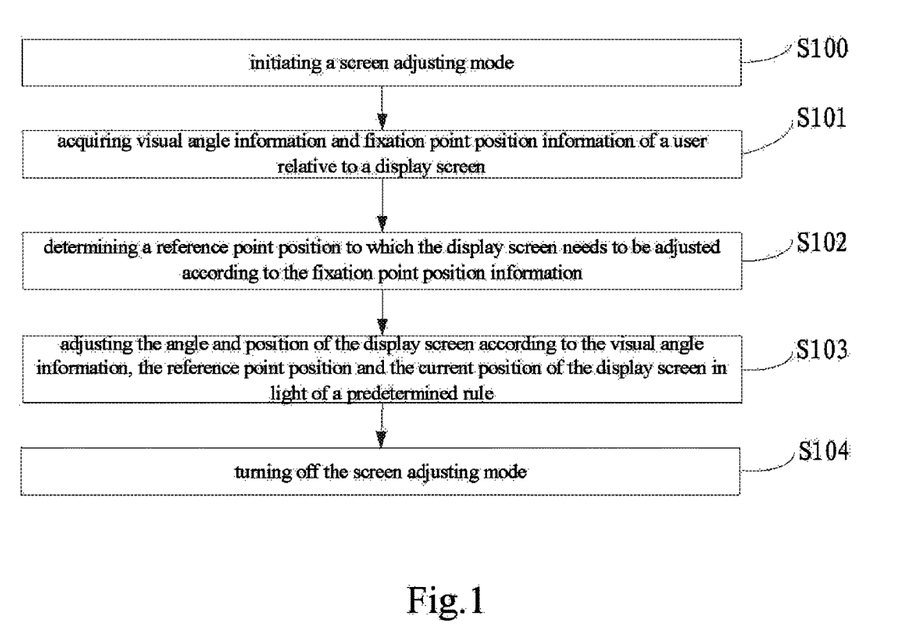
FIG. 1 is a flow chart of a display screen adjusting method according to an embodiment.

According to an embodiment, there is provided a display screen adjusting method as shown in FIG. 1, which may comprise the steps of:

S100: optionally initiating a screen adjusting mode of the display screen. Alternatively, the screen adjusting mode can always be in an on state in the display screen, in such a manner that a user can adjust the angle and position of the display screen at any time without initiating the screen adjusting mode.

S101: acquiring visual angle information and fixation point position information of the user relative to a display screen. The visual angle information may comprise an angle formed between the sight line of the user and a plane of the display screen. The fixation point position information may comprise the position where the sight line of the user intersects with the plane of the display screen.

S102: determining a reference point position to which the display screen needs to be adjusted according to the fixation point position information.

S103: adjusting the angle and position of the display screen according to the visual angle information, the reference point position and the current position of the display screen in light of a predetermined rule.

S104: as an optional step, turning off the screen adjusting mode after the step of adjusting the angle and position.

Alternatively, the screen adjusting mode may not be turned off in such a manner that the screen adjusting mode can always be in an on state and the user can adjust the angle and position of the screen at any time.

In the display screen adjusting method according to the above embodiment, visual angle information and fixation point position information of a user's eye relative to a display screen can be acquired; the reference point position to which the display screen needs to be adjusted can be determined according to the fixation point position information; and the angle and position of the display screen can be adjusted according to the visual angle information, the reference point position and the current position of the display screen in light of a predetermined rule. Hence, the display screen adjusting method and the corresponding display screen adjusting apparatus can automatically adjust the angle and position of the display screen with an optimal adjusting effect and without needs of manual regulation, which provides convenience to the user and improve the user's viewing experience.

The exemplary implementations of the above steps will be explained in detail.

In the step S101, the visual angle information may comprise an angle formed between sight lines of the user's both eyes and a plane of the display screen. The fixation point position information may comprise the positions where the sight lines of the user's two eyes intersect with the plane of the display screen, where there may be one or two points where the sight lines of the user's eyes intersect with the plane of the display screen. In the specific implementation, the visual angle information and the fixation point position information as described above can be determined by acquiring the positional coordinates and visual angle of pupils and the like. For instance, when the pupils are gazing at a position of the display screen, it is possible to acquire the two-dimensional coordinates of the point where the sight lines intersect with the plane of the display screen so as to determine the above fixation point positional information. The three-dimensional coordinates of the pupils can be acquired so as to determine the visual angle information in conjunction with the fixation point position information as described above. In addition, it is also possible to acquire other parameters to determine the visual angle information and the fixation point position information, the ways of determining which will not be limited herein.

In an embodiment, in the step S101, the step of acquiring the visual angle information and fixation point position information of the user relative to the display screen may comprise:

acquiring the visual angle information and fixation point position information of the user relative to the display screen when the time period during which the sight line of the user is kept fixed exceeds a predetermined time period, or optionally, acquiring the visual angle information and fixation point position information of the user's both eyes relative to the display screen when the time period during which the sight lines of the user's two eyes are kept fixed exceeds a predetermined time period. The information acquired by the display screen adjusting method is the information on the slight line of the user relative to the display screen. To avoid maladjustment of a display screen due to fast movement of the user's slight line, in some embodiments, it is necessary to acquire the information on the slight line of the user relative to the display screen when the time period during which the sight lines of the user's eyes are kept fixed exceeds a predetermined time period. For instance, fixation duration information can be acquired at the same time of acquiring the visual angle information and the fixation point position information. The fixation duration information may comprise the time when the user's sight line enters into the display screen for the first time, the fixation duration at the first detected fixation point and the duration in which the fixation point remains at the same position, etc. When the time period during which the user's sight line entering into the display screen is kept fixed at a position exceeds 3 seconds, the visual angle information and the fixation point position information of the user's two eyes relative to the display screen can be acquired. In other embodiments, other time can be set as the predetermined time period as described above, which will not be limited herein.

In the step S102 as described above, a reference point position to which the display screen needs to be adjusted is determined according to the acquired fixation point position information. In an embodiment, the position where the user's sight line intersects with the plane of the display screen is taken as the reference point position.

In some embodiments, there may be one or two points where the sight lines of the user's two eyes intersect with the plane of the display screen. The reference point position to which the display screen needs to be adjusted shall be determined respectively in the above two circumstances.

When the fixation point position information is two positions where the sight lines of the user's two eyes respectively intersect with the plane of the display screen, the central point of the line connecting the two positions is taken as the reference point position.

When the fixation point position information is one position where the sight lines of the user's two eyes intersect with the plane of the display screen respectively, the one position is taken as the reference point position.

In the step S103 as described above, the angle and position of the display screen are adjusted according to the visual angle information, the reference point position and the current position of the display screen in light of a predetermined rule. The step may comprise:

adjusting the angle of the display screen according to the visual angle information so as to make the plane of the adjusted display screen perpendicular to the sight line of the user; and/or adjusting the central position of the display screen to coincide with the reference point position according to the reference point position and the current position of the display screen.

In a further embodiment, when the visual angle information and the fixation point position information are those of the user's two eyes relative to the display screen, since the respective sight lines of the two eyes are not completely coincident with each other, it is possible to take the bisector of the angle formed between the sight lines of the user's two eyes as the sight lines of the user's eyes. Thus, the plane of the adjusted display screen may be made perpendicular to the bisector of the angle formed between the sight lines of the user's two eyes.

In specific implementation, for the sake of better viewing experience for the user, the visual angle of the user's two eyes relative to the display screen can be adjusted so as to make the plane of the adjusted display screen perpendicular to the sight lines of the user's eyes, namely, making the adjusted visual angle to be 90 degrees. According to the different needs of the user, it is also possible to maintain the adjusted visual angle at other degrees, like 60 degrees or 70 degrees, which will not be specifically limited herein. Moreover, after determining the reference point position as described above, the position of the display screen can be adjusted so as to make the central position of the adjusted display screen coincide with the reference point position, thereby further enhancing the user's viewing experience. The step of adjusting the angle of the display screen and the step of adjusting the position of the display screen as described above are interchangeable, that is, the sequence of the two steps can be flexibly exchanged as needed, which will not be limited herein.

In an implementation, in the above method, when the fixation point position information is the two positions where the sight lines of the user's two eyes respectively intersect with the plane of the display screen, after adjusting the angle of the display screen according to the visual angle information so as to make the plane of the adjusted display screen perpendicular to the sight lines of the user's two eyes, the above method may further comprise the step of:

according to the fixation point position information and the current position of any edge of the display screen, adjusting the edge to be parallel to the line connecting the two positions where the sight lines of the user's two eyes respectively intersect with the plane of the display screen.

In specific implementation, any edge of the display screen may be any long edge or any short edge. If the display screen is of a square shape, any edge thereof can be selected for use. When the fixation point position information is the two positions where the sight lines of the user's two eyes respectively intersect with the plane of the display screen, the line connecting the two positions is taken as a reference line, and the line of a selected edge of the display screen is adjusted to be parallel to the reference line so that the display screen is rotated within a plane, which is a visual angle that is better for the user's eyes, thereby improving the user's viewing experience.

In an embodiment, the above display screen adjusting method can automatically turn off the screen adjusting mode after adjusting the display screen, so that the user may have access to the normal watching mode. The above method provided by the above embodiment also provides convenience to the disabled whose hands cannot move easily. There is no need for the user to operate manually. Instead, the angle and position of the display screen can be adjusted automatically with an adjusting effect better than the manual adjusting effect, which enhances the user's viewing experience.

The following is an example of display screen adjustment under the circumstances that the sight lines of the user's two eyes respectively intersect with the plane of the display screen at two points, which is aimed to explain the display screen adjusting method provided by some embodiments.

Figure 2:
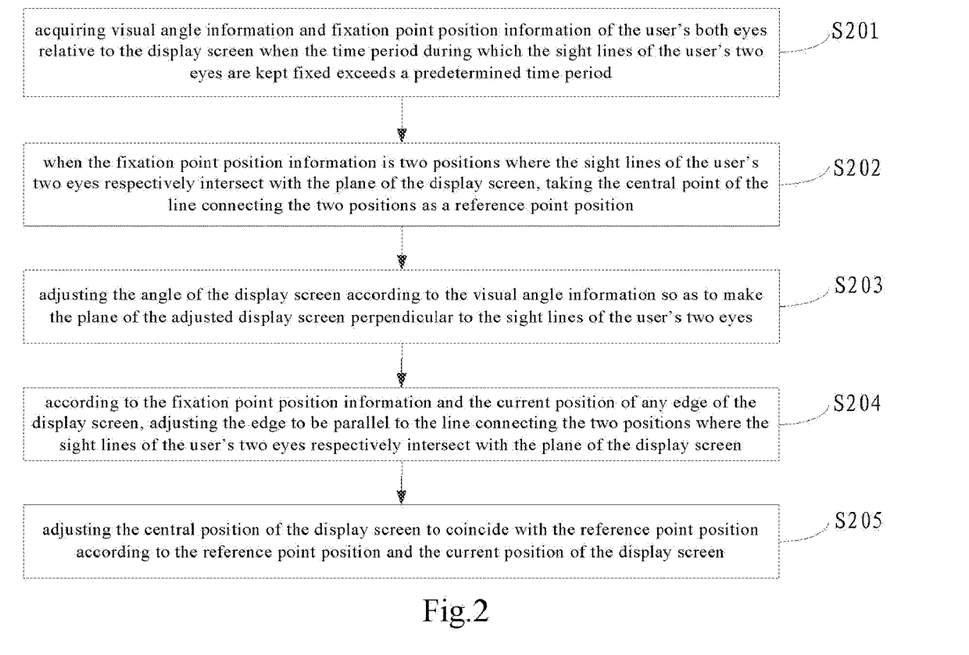
FIG. 2 is a flow chart of an instance according to an embodiment.

As shown in FIG. 2, the display screen adjusting method may comprise the steps of:

S201: acquiring visual angle information and fixation point position information of the user's two eyes relative to the display screen when the time period during which the sight lines of the user's two eyes are kept fixed exceeds a predetermined time.

S202: when the fixation point position information is two positions where the sight lines of the user's two eyes respectively intersect with the plane of the display screen, taking the central point of the line connecting the two positions as a reference point position.

S203: adjusting the angle of the display screen according to the visual angle information so as to make the plane of the adjusted display screen perpendicular to the sight lines of the user's two eyes.

S204: according to the fixation point position information and the current position of any edge of the display screen, adjusting the edge to be parallel to the line connecting the two positions where the sight lines of the user's two eyes respectively intersect with the plane of the display screen.

S205: adjusting the central position of the display screen to coincide with the reference point position according to the reference point position and the current position of the display screen.

According to some embodiments, there is provided a display screen adjusting apparatus. Since the display screen adjusting apparatus and the display screen adjusting method as described above are based on the same inventive concept and have substantially the same principle for problem solution, reference can be made to the implementation of the display screen adjusting method above for the implementation of the display screen adjusting apparatus, which will not be reiterated.

Figure 3:
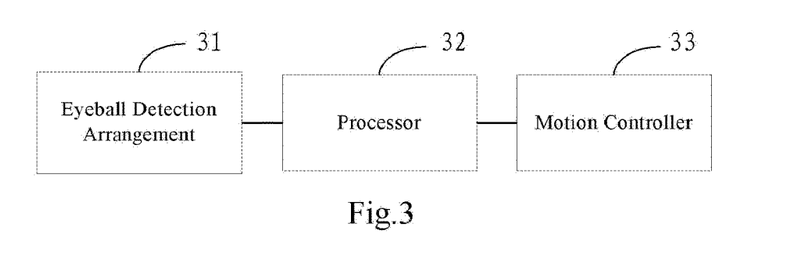
FIG. 3 is a structural schematic view of a display screen adjusting apparatus according to an embodiment.

FIG. 3 shows the structure of the display screen adjusting apparatus according to an embodiment. As shown in FIG. 3, the display screen adjusting apparatus comprises an eyeball detection arrangement 31, a processor 32 and a motion controller 33 connected with the display screen.

The eyeball detection arrangement 31 can be configured to acquire visual angle information and fixation point position information of the user relative to the display screen. The visual angle information may comprise an angle formed between the sight line of the user and a plane of the display screen. The fixation point position information may comprise the positions where the sight line of the user intersects with the plane of the display screen. As stated above with reference to the display screen adjusting method, the eyeball detection arrangement 31 can be configured to acquire the visual angle information and the fixation point position information when the screen adjusting mode is on. Moreover, the eyeball detection arrangement 31 can be configured to acquire visual angle information and the fixation point position information of the user's both eyes relative to the display screen. The relation between the sight line of the user and the sight lines of the user's two eyes has been explained before, which will not be reiterated herein.

The processor 32 can be configured to determine a reference point position to which the display screen needs to be adjusted according to the fixation point position information.

The motion controller 33 can be configured to adjust the angle and position of the display screen according to the visual angle information, the reference point position and the current position of the display screen in light of a predetermined rule. The motion controller 33 may comprise mechanical structures, such as bearings, so as to achieve the rotation and translation of the display screen.

In an embodiment, the eyeball detection arrangement 31 can be configured to acquire visual angle information and fixation point position information of the user relative to the display screen when the time period during which the sight line of the user is kept fixed exceeds a predetermined time period. In an embodiment, the eyeball detection arrangement 31 can be configured to monitor and acquire the visual angle information and the fixation point position information of the user's two eyes relative to the display screen, so as to acquire the visual angle information and the fixation point position information when the time period during which the sight lines of the user's two eyes are kept fixed exceeds a predetermined time period.

In an embodiment, the processor 32 can be configured to, when the fixation point position information is two positions where the sight lines of the user's two eyes respectively intersect with the plane of the display screen, take the central point of the line connecting the two positions as the reference point position. When the fixation point position information is one position where the sight lines of the user's two eyes intersect with the plane of the display screen, the one position is taken as the reference point position.

In an embodiment, the motion controller 33 can be configured to adjust the angle of the display screen according to the visual angle information so as to make the plane of the adjusted display screen perpendicular to the sight line of the user. When the visual angle information is the angle formed between the sight lines of the user's two eyes and the plane of the display screen, the motion controller 33 can also be configured to adjust the angle of the display screen according to the visual angle information so as to make the plane of the adjusted display screen perpendicular to the bisector of the angle formed between the sight lines of the user's two eyes. The motion controller 33 can also be configured to adjust the central position of the display screen to coincide with the reference point position according to the reference point position and the current position of the display screen.

In an embodiment, when the fixation point position information is two positions where the sight lines of the user's two eyes respectively intersect with the plane of the display screen, the motion controller 33 can also be configured to, according to the fixation point position information and the current position of any edge of the display screen, adjust the edge to be parallel to the line connecting the two positions where the sight lines of the user's two eyes respectively intersect with the plane of the display screen.

In some embodiments, the eyeball detection arrangement 31 as above may be an eye tracker that can be used to improve the accuracy in acquisition of the visual angle information and the fixation point position information as described above. After the eye tracker acquires the visual angle information and the fixation point position information, the acquired information is sent or transmitted to the processor 32 as described above. The processor 32 may determine the reference point position to which the display screen needs to be adjusted, and further the angle and distance of the display screen to be adjusted, and may send the angle and distance of the display screen to be adjusted as the movement instruction to the motion controller 33 as described above. The motion controller 33 adjusts the angle and position of the display screen according to the movement instruction of the processor 32.

There is also provided a display device according to an embodiment. The display device can comprise a display screen and any of the display screen adjusting apparatus as described above.

In the display screen adjusting method, the display screen adjusting apparatus and the display device according to some embodiments, visual angle information and fixation point position information of a user relative to a display screen are acquired; a reference point position to which the display screen needs to be adjusted is determined according to the fixation point position information; and the angle and position of the display screen are adjusted according to the visual angle information, the reference point position and the current position of the display screen in light of a predetermined rule. The display screen adjusting method and apparatus, as well as the display device, provided by the above embodiments, can automatically adjust the angle and position of the display screen with an optimal adjusting effect and without needs of manual regulation, which provides convenience to the user and improves the user's viewing experience.

It can be understood that the above embodiments are only exemplary embodiments of the present invention, but not intended to limit the protection scope of the present invention. Those skilled in the art can make various modifications and variations of the embodiments without departing from the spirit and scope of the present invention. Any modifications and variations made within the spirit and scope of the present invention will fall within the scope of the claims of the present applications and equivalents thereof. Therefore, the protection scope defined by the claims of the present application encompasses all of these modifications and variations. The protection scope of the present invention shall be based on the protection scope of the appended claims.

What needs to be explained is that some of the above embodiments are only illustrated by way of the individual function modules division. In actual application, the above functions can be allocated to different functional modules as desired. The internal structure of the device can be divided into different functional modules so as to accomplish all or part of the functions as stated above. In addition, function(s) of the above one module can be achieved by a plurality of modules, and functions of the plurality of modules can be integrated into one module.

The term "and/or" used herein is only used to describe the connecting relations between objects connected thereby, which may be of three types. For instance, "A and/or B" can represent the following three situations: either A alone, or B alone, or both A and B. In addition, the character "/" used herein generally indicates that the former and the latter objects connected thereby is in a "or" relationship.

In the claims, any reference sign in parentheses should not be interpreted as a limitation to the claims. The term "comprise/include" does not exclude the presence of elements or steps other than those listed in the claims. The article "a" or "an" in front of elements do not exclude the presence of a plurality of such elements. The present invention may be achieved by hardware comprising a plurality of separate elements, or by properly programmed software or firmware, or by any combination thereof.

In device or system claims that enumerate several means, one or more of the means can be embodied in one and the same item of hardware. The mere fact that some measures are recited in dependent claims that are different from each other does not indicate that the combination of the measures cannot be used to advantage.

What is claimed is:

1. A display screen adjusting method, comprising the steps of:
acquiring visual angle information and fixation point position information of a user relative to a display screen, the visual angle information comprising an angle formed between the sight line of the user and a plane of the display screen, and the fixation point position information comprising the position where the sight line of the user intersects with the plane of the display screen;
determining a reference point position to which the display screen needs to be adjusted according to the fixation point position information; and
adjusting the angle and position of the display screen according to the visual angle information, the reference point position and the current position of the display screen in light of a predetermined rule,
wherein the step of acquiring the visual angle information and fixation point position information of the user relative to the display screen comprises:

acquiring the visual angle information and fixation point position information of the user relative to the display screen when a time period during which the sight line of the user is kept fixed exceeds a predetermined time period, wherein the visual angle information and the fixation point position information are visual angle information and fixation point position information of the user's both eyes relative to the display screen, and the step of determining the reference point position to which the display screen needs to be adjusted according to the fixation point position information comprises:

when the fixation point position information is two positions where the sight lines of the user's two eyes respectively intersect with the plane of the display screen, taking the central point of the line connecting the two positions as the reference point position; and when the fixation point position information is one position where the sight lines of the user's two eyes intersect with the plane of the display screen, taking the one position as the reference point position.

2. The method according to claim 1, wherein the step of adjusting the angle and position of the display screen according to the visual angle information, the reference point position and the current position of the display screen in light of the predetermined rule comprises:

adjusting the angle of the display screen according to the visual angle information so as to make the plane of the adjusted display screen perpendicular to the sight line of the user; and/or adjusting the central position of the display screen to coincide with the reference point position according to the reference point position and the current position of the display screen.

3. The method according to claim 1, wherein the step of adjusting the angle and position of the display screen according to the visual angle information, the reference point position and the current position of the display screen in light of the predetermined rule comprises:

adjusting the angle of the display screen according to the visual angle information so as to make the plane of the adjusted display screen perpendicular to an bisector of an angle formed between the sight lines of the user's two eyes; and/or adjusting the central position of the display screen to coincide with the reference point position according to the reference point position and the current position of the display screen.

4. The method according to claim 3, wherein the step of adjusting the angle and position of the display screen according to the visual angle information, the reference point position and the current position of the display screen in light of the predetermined rule also comprises:

when the fixation point position information is two positions where the sight lines of the user's two eyes respectively intersect with the plane of the display screen, adjusting an edge of the display screen to be parallel to the line connecting the two positions where the sight lines of the user's two eyes respectively intersect with the plane of the display screen.

5. The method according to claim 1, further comprising:
initiating a screen adjusting mode before acquiring the visual angle information and the fixation point position information; and turning off the screen adjusting mode after adjusting the angle and position.

6. A display screen adjusting apparatus, comprising an eyeball detection arrangement, a processor and a motion controller connected with a display screen, wherein the eyeball detection arrangement is configured to acquire visual angle information and fixation point position information of a user relative to the display screen, the visual angle information comprising an angle formed between the sight line of the user and a plane of the display screen, and the fixation point position information comprising the position where the sight line of the user intersects with the plane of the display screen;

the processor is configured to determine a reference point position to which the display screen needs to be adjusted according to the fixation point position information; and the motion controller is configured to adjust the angle and position of the display screen according to the visual angle information, the reference point position and the current position of the display screen in light of a predetermined rule, wherein the eyeball detection arrangement is also configured to acquire the visual angle information and fixation point position information of the user relative to the display screen when a time period during which the sight line of the user is kept fixed exceeds a predetermined time period, wherein the eyeball detection arrangement is configured to acquire visual angle information and fixation point position information of the user's both eyes relative to the display screen, the processor is also configured to, when the fixation point position information is two positions where the sight lines of the user's two eyes respectively intersect with the plane of the display screen, take the central point of the line connecting the two positions as the reference point position; and when the fixation point position information is one position where the sight lines of the user's two eyes intersect with the plane of the display screen, take the one position as the reference point position.

7. The apparatus according to claim 6, wherein the motion controller is also configured to adjust the angle of the display screen according to the visual angle information so as to make the plane of the adjusted display screen perpendicular to the sight line of the user; and adjusting the central position of the display screen to coincide with the reference point position according to the reference point position and the current position of the display screen.

8. The apparatus according to claim 6, wherein the motion controller is also configured to adjust the angle of the display screen according to the visual angle information so as to make the plane of the adjusted display screen perpendicular to an bisector of an angle formed between the sight lines of the user's two eyes; and adjust the central position of the display screen to coincide with the reference point position according to the reference point position and the current position of the display screen.

9. The apparatus according to claim 8, wherein the motion controller is also configured to, when the fixation point position information is two positions where the sight lines of the user's two eyes respectively intersect with the plane of the display screen, adjust an edge of the display screen to be parallel to the line connecting the two positions where the sight lines of the user's two eyes respectively intersect with the plane of the display screen.

10. The apparatus according to claim 6, wherein the display screen adjusting apparatus is also configured to initiate a screen adjusting mode before acquiring the visual angle information and the fixation point position information; and turn off the screen adjusting mode after adjusting the angle and position.

11. The apparatus according to claim 6, wherein the eyeball detection arrangement comprises an eye tracker.

12. A display device comprising a display screen and a display screen adjusting apparatus that comprises an eyeball detection arrangement, a processor and a motion controller connected with the display screen, wherein the eyeball detection arrangement is configured to acquire visual angle information and fixation point position information of a user relative to a display screen, the visual angle information comprising an angle formed between the sight line of the user and a plane of the display screen, and the fixation point position information comprising the position where the sight line of the user intersects with the plane of the display screen;

the processor is configured to determine a reference point position to which the display screen needs to be adjusted according to the fixation point position information; and the motion controller is configured to adjust the angle and position of the display screen according to the visual angle information, the reference point position and the current position of the display screen in light of a predetermined rule, wherein the eyeball detection arrangement is also configured to acquire the visual angle information and fixation point position information of the user relative to the display screen when a time period during which the sight line of the user is kept fixed exceeds a predetermined time period, wherein the eyeball detection arrangement is configured to acquire visual angle information and fixation point position information of the user's both eyes relative to the display screen, the processor is also configured to, when the fixation point position information is two positions where the sight lines of the user's two eyes respectively intersect with the plane of the display screen, take the central point of the line connecting the two positions as the reference point position; and when the fixation point position information is one position where the sight lines of the user's two eyes intersect with the plane of the display screen, take the one position as the reference point position.

13. The display device according to claim 12, wherein the motion controller is also configured to adjust the angle of the display screen according to the visual angle information so as to make the plane of the adjusted display screen perpendicular to the sight line of the user; and adjusting the central position of the display screen to coincide with the reference point position according to the reference point position and the current position of the display screen.

14. The display device according to claim 12, wherein the eyeball detection arrangement comprises an eye tracker.

* * * * *